March 24, 1936.  W. W. FULLER  2,034,803
METHOD OF AND APPARATUS FOR PRODUCING INTELLIGIBLE
SOUND FROM OPTICAL INDICIA
Filed Nov. 9, 1934
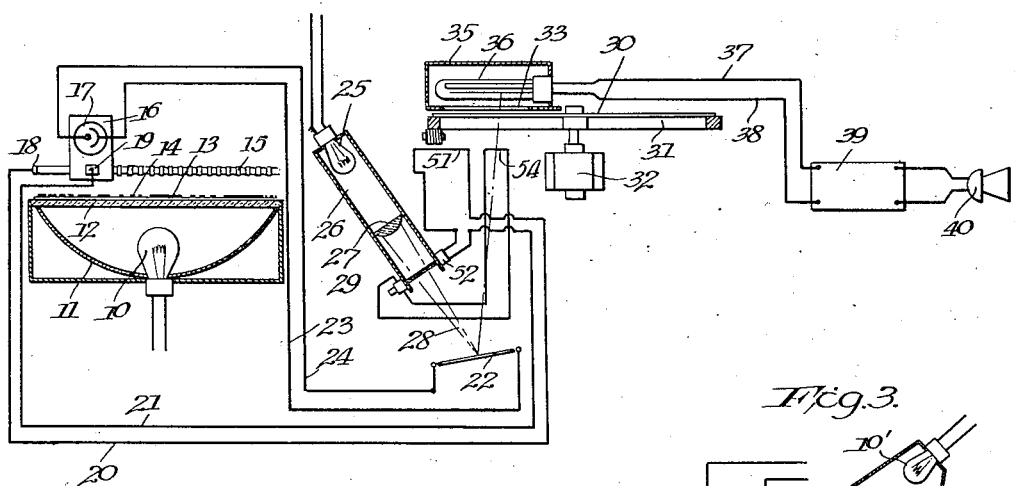
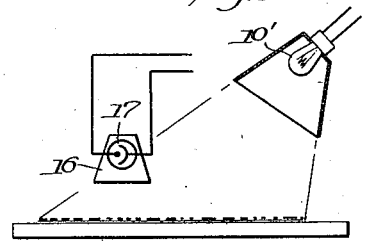
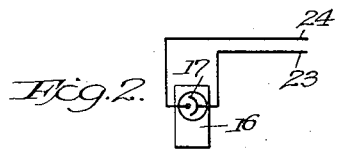
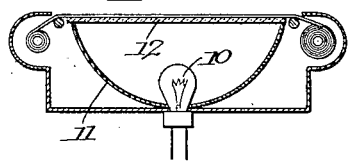
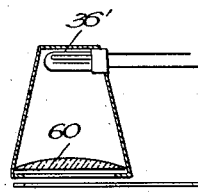
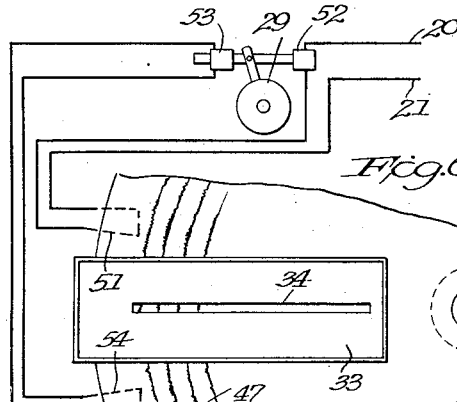
Inventor
Wallace W. Fuller
By Cushman, Darby, & Cushman
Attorneys Patented Mar. 24, 1936

2,034,803

UNITED STATES PATENT OFFICE 2,034,803

METHOD OF AND APPARATUS FOR PRODUCING INTELLIGIBLE SOUND FROM OPTICAL INDICIA

Wallace W. Fuller, Washington, D. C.

Application November 9, 1934, Serial No. 752,333

20 Claims. (Cl. 179—100.3)

This invention relates to a method of and apparatus for producing intelligible audible sounds, such as speech, in accordance with optical indicia appearing upon a sheet, such as a printed page, roll of sheet material, or the like.

The invention has particular utility as a means to enable blind persons to read from a printed sheet. By the use of my invention, it is possible for a blind person to hear a message, previously placed on inexpensive sheet material in the form of permanent visible characters.

The broad idea of the invention is to utilize a light sensitive cell to scan printed indicia on a sheet, and to provide means controlled by the light-sensitive cell to emit an intelligible audible sound corresponding to the indicia being scanned, so that a person will hear the same and be apprised thereby of the meaning of the indicia.

In the following specification and claims, the word "electrical" is used in its broadest sense, and must be understood to include electronics.

In the specific embodiment of the invention, hereinafter described, and illustrated diagrammatically in the accompanying drawing, the system comprises first, a printed sheet or the equivalent, second, a light-sensitive scanning device, third, an electrical (including electronic) selector controlled by the light-sensitive scanning device, fourth, a sound record having a plurality of different individual sounds, such as speech, recorded thereon, and fifth, a sound reproducer associated with the record and controlled by the selector so as to reproduce one or another of the sounds on the record, corresponding to the particular indicia or character being scanned by the scanning device.

Although the separate elements of the combination are known per se, I am the first to combine the elements to perform the function described. I am the first to provide a method of, and apparatus for producing intelligible audible sounds corresponding to optical characters appearing on a printed sheet. In other words, as far as I am aware, I am the first to provide a method of and apparatus for mechanically and electrically "reading" a printed page or the equivalent thereof. Obviously, such a method and apparatus will have great utility to persons afflicted with deficient eyesight.

The only limitation upon the use of the present invention relates to the number of different sounds which can be recorded upon the sound record or records. In the simplest form of the invention, the sounds are merely the spoken sounds of the twenty-six letters of the alphabet, with the optional addition of sounds or time delays corresponding respectively to numbers and punctuation marks. In this simple form of the invention, the user of the apparatus simply spells out each word appearing on the printed page. In more complex forms of the invention, a great plurality of sounds corresponding to different words are recorded on the record or records, and the electrical selector selects a word corresponding to a particular wordsign or indicia appearing on the printed sheet. This word may have been recorded in one or more parts. Since the problem of selection is relatively simple, the individual sounds can be recorded upon a single record or upon a plurality of different records. The selector in the latter case is of a plural stage type, first selecting the proper record, and then the proper sound track thereon, to correspond to the particular character being scanned.

In the present preferred form of the invention, we use a scanning device including a light sensitive cell, and a photo-electric sound reproducer. Also, I use a sound track selector of the damped, sensitive mirror galvanometer type, or oscilloscope, actuated by the scanning device circuit, to select the particular sound track desired but it must be understood that my invention is not limited to elements of these types, as many equivalent devices will readily occur to one skilled in the art, and my invention must be considered to cover any devices falling within the scope of the appended claims, or their equivalents. I prefer to use a light beam selector and a photo-electric type sound reproducer because of their flexibility and simplicity of operation, but it will be apparent that mechanical or other electrical sound reproducing apparatus and/or other electrical or mechanical selectors can be substituted.

In many cases, it has been found desirable to provide means to make certain that a sound track is brought into operative relation with the sound reproducer only at the beginning, or point of commencement of the sound sequence thereon. In other words, it has been found advantageous to provide means to prevent a sound track from being selected by the selector and put into operative relation to the sound reproducer at a point somewhere between the beginning and the end of the sound sequence.

Many ways of accomplishing this result will occur to one skilled in the art, and I do not wish to be limited to the specific means disclosed in the drawing or the alternative means described in the specification.

In the accompanying drawing:

Figure 1 is a diagrammatic view of an apparatus in accordance with the present invention.

Figure 2 is a diagrammatic view of a modified form of sheet holding device.

Figure 3 shows a modified form of sheet illuminating means.

Figure 4 shows a modified form of light beam receiving device.

Figure 5 shows a modified form of record.

Figure 6 is a composite fragmentary plan view and wiring diagram of a part of the apparatus of Figure 1.

Figures 7, 8 and 9 show, respectively, various types of printed indicia which may be used upon the sheet which is to be read by the apparatus.

Referring to Figure 1, a suitable source of light is shown at 10, mounted in an appropriate casing comprising a reflector 11 and a transparent supporting plate 12. Upon the cover plate 12, there is shown a sheet 13 having indicia 14 printed or otherwise formed thereon. In the form shown in Figure 1, the different characters constituting the indicia 14 have the effect of varying the transmission of light from the source 10 through the sheet. The characters may be of variable density, area, color, and translucency to produce variations or modifications of the light rays passing upwardly from the sheet.

Disposed above the sheet 13, and preferably slidably mounted upon a supporting bar 15, is a scanning device 16, including a light sensitive cell 17. The latter may be a photronic cell as diagrammatically represented in Fig. 1, or any other type of photo-electric or light-sensitive device adapted to be affected by the light rays or beams passing upwardly through or around the characters 14 on the sheet.

The bar 15 is provided with a plurality of spaced electrical contact elements 18, and the scanning device is provided with a cooperating contact element 19, so that an electrical circuit will be completed through wires 20, 21, when the scanning device is properly positioned over a character, as will be more fully described below.

The light-sensitive cell 17 of the scanning device is in circuit through appropriate amplification if desired, with a galvanometer mirror 22 by means of wires 23, 24. The galvanometer must be of a type not affected by heat, and must have an action suitable for use with the current set up or controlled by the cell 17. In accordance with the well known characteristics of such devices, the angular position of the galvanometer mirror will be changed by oscillation in accordance with variations in the current flowing from the light-sensitive cell 17 through the circuit 23, 24.

A second source of light 25 is disposed in a barrel 26 having an appropriate lens system 27 therein, so that a pencil or slit of light 28 is projected onto the mirror 22. A shutter 29 may be interposed in the path of this beam of light for purposes described below.

A sound record 30, of special type, is mounted upon a rotatable turntable 31 driven by a constant speed motor 32. Table 31 is made of thin clear optical glass or the like.

Above the turntable and record, I provide a mask 33 having a slot 34 therein. The mask may conveniently be in the form of the bottom wall of a casing 35 for an elongated light-sensitive cell 36 of such a type as a photo-electric cell. Instead of the special elongated cell diagrammatically disclosed, it is entirely feasible to use a plurality of small, conventional photo-electric cells disposed in close proximity to one another and connected in parallel.

Connected to the photo-electric cell circuit 36 by appropriate electrical conduits 37, 38, is a conventional audio-frequency amplifier 39. The latter, in turn, may be connected to an appropriate loud speaker or ear-phone 40.

The sound record of the present invention has certain novel characteristics, and two (2) alternative forms of the same are represented, somewhat diagrammatically, in Figures 5 and 6. Referring to Figure 6, the record comprises a disk 45 of appropriate transparent or translucent material, such as celluloid, cellulose acetate or regenerated cellulose or simply a photographic glass plate, or the like. The surface of the record is provided with a plurality of individual, independent sound tracks 46, 47, etc., and these tracks may conveniently be in the form of opaque markings of varying area, density or color, adapted to modify a beam, slit, or pencil of light, in a manner well known in the talking motion picture art. Each sound track has a definite point of commencement 48, and a definite point of termination 49. The several tracks are preferably concentrically arranged on the disk. In other words, the record 30 of the present invention comprises, in reality, a plurality of different, independent records 46, 47, etc., mounted on a common carrier member 45.

The form of record shown in Figure 5 is substantially the same as that already described, with the exception that the various sound tracks are placed upon the surface of a cylinder, rather than a disk. It will be understood that in both cases the illustrations are diagrammatic only, and that, whereas only a relatively few tracks are shown, in actual practice, a great plurality of individual sound tracks will be placed upon each record.

Each of the individual sound tracks appearing on the record of the present apparatus represents a different predetermined sound. The sounds may correspond to the spoken sounds of individual letters, or complete distinct words, or portions of words or letters in the nature of diaphones or phonemes. Thus, when a particular sound track is brought into operative relation to the light sensitive cell 36 and the amplifier 39, a definite, predetermined sound will be emitted by the speaker 40.

As previously stated, the indicia 14 on the sheet 13 consists of characters which have variable effect upon the transmission, or reflection and absorption of light. The variable character of the indicia may be effected by a difference, from one to another, of density, area, color, translucency, reflectivity, or the like.

In Figure 7, I have shown, by way of illustration, the letters A and B printed in such a manner as to have different areas. Obviously, letters printed in this manner will have a different effect upon the light sensitive cell 17 of the scanning device, and will tend to oscillate the mirror 22 to different degrees. Instead of making the letters so as to have different areas, as shown in Figure 7, these letters might be made of different degrees of translucency, by using different inks, or different amounts of ink. Furthermore, it is well known that the printed letters of the alphabet have certain inherent differences of area. For instance, the letter W has considerably more area than the letter I. In accordance with the present invention, the inherent differences of the letters of the alphabet may be accentuated and modified by changing slightly the size of the individual portions of the letters, or by changing the translucency thereof.

In Figures 8 and 9, different kinds of indicia are shown. In the first, squares or rectangles of different size are utilized to represent different sounds, whereas in the second case, circles of different area are used for the same purpose. Of course, it is within the scope of the present invention to use squares, circles, or other figures of equal or different size, and to modify their characteristics by changing the translucency, reflectivity, or color.

Whenever the words "relay" and "solenoid" are used in the present specification, it must be understood that their well known substitutes are included.

As stated at the outset of the specification, it has been found desirable in some cases to provide means to make certain that the individual sound records or sound tracks, shall be brought into operative relation with the sound reproducer, only at the beginning thereof, and not at a point between the beginning and the end. A plurality of different means for accomplishing this result will occur to one skilled in the art, and the particular means disclosed herein must be considered to be illustrative only and not restrictive of the invention. Associated with the turntable 31 is a permanent magnet 50, the flux of which is disposed to pass through conductor 51. This conductor is in series with the electrical conduits 20, 21, and contacts 18, 19, and with solenoid 52 associated with the shutter 29. Thus, when the scanning device is properly positioned over a character and the circuit is closed through contacts 18, 19, the shutter 29 will be opened by the current induced in the circuit when the flux of the permanent magnet, disposed adjacent the start end of the sound tracks, passes through the conductor 51. As shown in Figure 6, solenoid 52 serves to open the shutter 29, while solenoid 53 serves to close the same. The latter is energized when the flux of the magnet 50 passes through conductor 54 at the end of substantially a complete revolution of a record.

Instead of using a shutter or other means to interrupt the light beam to prevent an inopportune starting of a particular sound record, appropriate relay switches or substitutes may be used to make and/or break any one of the circuits to effect the desired result. A simple and expedient way of effecting this result is to place an overload relay switch or substitute in the circuit leading from the light-sensitive cell 36 to the amplifier, the switch being operated by a control circuit so that the switch will be closed and the circuit operated only when a light beam has been projected through the relatively clear area of the record before and at the beginning of the sound track. Thus, if the beam were thrown onto a record at a point part-way around the same where a substantial portion of light interrupting material was present, the current flowing through the cell 36 would not be sufficient to close the relay, and no sound would be emitted by the speaker 40. It is well known that the currents passing through different types of light-sensitive cells, such as photronic cells and photo-electric cells, can be utilized to operate or control relay switches, or substitutes, and it is within the scope of the present invention to operate appropriate relay switches for the above described purposes by such currents.

The modification illustrated in Figure 2 shows the sheet material bearing the indicia as being in roll or tape form. It must be understood that in the case of this form of the invention, as in the case of the previously described one, the sheet material may be of any convenient substance, such as paper, cellophane, parchment, and the like.

In the form of the invention illustrated in Figure 3, the indicia on the sheet are illuminated reflectively rather than transmissively, by a source of light 10'.

In the modification illustrated in Figure 4, a collector lens 60 is placed in the casing disposed above the sound record. This lens tends to converge the beams of light and enables the use of a smaller light-sensitive cell 36'.

The circuit disclosed in Figure 1 may be provided with suitable change-over switches to permit the use of certain parts of the apparatus with radio-receiving apparatus and the like. For instance, the audio-amplifier and speaker 40 are inherently adapted for use with radio reception, and it is within the scope of my invention to provide appropriate switches to permit this use. Moreover, additional change-over switches may be provided to permit the use of the scanning device 16, or the light-sensitive cell 36 as a sound reproducing element in connection with other types of sound records, such as the sound portions of talking motion picture films or the like.

As stated above, the light 10, or the support 12, or the indicia, may be of a predetermined desired characteristic color to cooperate more efficiently with the light sensitive cell 17. Certain types of cells are particularly sensitive to lights of certain frequencies or colors, and if colored light is used, the cell 17 may be of a high vacuum type. It is well known that the color sensitivity characteristic of the cells may be used to produce current changes in their electrical circuits.

In the operation of the device, a record 30 having a plurality of predetermined different sounds recorded at different positions thereon is placed upon the turntable 31, and the motor 32 is started. The lights 10 and 25 are illuminated, and the mirror 22 will be in a neutral position where the beam 28 is not directed to any particular sound track. A sheet, such as a specially printed page, is placed upon the support 12, and the scanning device is positioned over the first character thereon. This character may represent any predetermined sound, such as the spoken sound of a letter, a word, a diaphone or a phoneme. A current of definite value will be set up in the circuit including the wires 23, 24, and the mirror 22 will be oscillated to a definite predetermined position, so that the beam of light 28 strikes upon a particular sound track adapted to produce a sound in the speaker 40 corresponding to the spoken sound of the first character on the sheet, now positioned under the scanning device. As soon as the beginning of the sound track, the point of commencement, reaches a predetermined point under the slot 24, the sound reproducer will be rendered operative, either by opening the shutter, or otherwise, and the sound will be emitted by the speaker. As soon as this sound has been heard, the shutter will be closed by the magnet passing the conductors 54. The position of the scanning device will be shifted to the next character, the position of the mirror will be changed by a different current flowing through the galvanometer, the device will be rendered operative by the control circuit 18, 19 functioning in synchronism with the scanning device, and a sound corresponding to the second character will be emitted. The time element may be so small that the optical and/or electrical impulses in the machine follow one another so closely as to merge into continuous speech sound. The operation continues in this manner until the entire page has been mechanically or electrically read.

It must be understood that the present invention, when considered either from the point of view of method or apparatus, is not limited to the details of construction disclosed, or to the precise steps described. Many modifications will occur to one skilled in the art, and all such modifications as fall within the scope of the appended claims or their equivalents, are within the scope of the invention.

I claim:—

1. An apparatus for producing a plurality of different intelligible audible speech sounds corresponding to definite optical indicia appearing on a sheet, comprising a sound producer adapted selectively to produce a plurality of predetermined, intelligible audible speech sounds and scanning means controlled by the indicia appearing on a sheet, said means serving to cause said producer selectively to produce a speech sound corresponding to the indicia.

2. A device of the class described comprising a sound record having a plurality of different sounds recorded on different portions thereof, a sound reproducer, and selector means for rendering the sound reproducer operative with different portions of said record to produce the particular sound recorded thereat, said selector means being electrically controlled by indicia disposed upon a carrier sheet to produce successive sounds corresponding to the indicia.

3. In a device of the class described, a sound record having a plurality of different sounds recorded on different portions thereof, a sound reproducer adapted to cooperate with different portions of said record to produce different sounds, a sheet having indicia thereon, and electrical selector means controlled by said indicia to render different portions of the record effective to produce different sounds corresponding to said indicia.

4. In a device of the class described, a sound record having a plurality of different sounds recorded on different portions thereof, a sound reproducer adapted to cooperate with different portions of said record to produce different sounds, a sheet having indicia thereon, and means controlled by said indicia to change the portion of the record which effectively cooperates with said sound producer to produce different audible sounds corresponding to said indicia.

5. An apparatus for producing intelligible audible sounds in accordance with indicia appearing on a printed page, said apparatus comprising a plurality of individual sound records associated with a common carrier, each of said records being adapted to produce a predetermined different sound when operatively combined with a sound reproducer, a sound reproducer and selector means for operatively combining one or another of said records therewith, said selector means being controlled by said indicia to select a record corresponding to the indicia.

6. An apparatus for producing intelligible audible sounds in accordance with indicia appearing on a printed page, said apparatus comprising a plurality of individual sound records associated with a common carrier, each of said records being adapted to produce a predetermined different sound when operatively combined with a sound reproducer, a sound reproducer, and means including a scanning device adapted to be affected by said indicia to effect cooperation between said sound reproducer and one or another of said records to produce a sound corresponding to a particular indicia being scanned.

7. A device for producing intelligible audible sound in accordance with optical indicia on a printed sheet, comprising a sound record having a plurality of independent, different, preformed sound tracks thereon, each adapted to set up a different predetermined intelligible audible sound in a sound reproducing apparatus, a sound reproducing apparatus, a scanning device for successively scanning said indicia, and means controlled by said scanning device to select the sound track of said record corresponding to the indicia being scanned and to render the same operative in said sound reproducing apparatus, whereby the latter produces a predetermined intelligible audible sound corresponding to the indicia being scanned.

8. An apparatus for producing intelligible audible sounds in accordance with visible indicia appearing on a sheet, said apparatus comprising a plurality of sound records mounted on a movable carrier and each adapted to produce a predetermined intelligible audible sound in a sound reproducer, a sound reproducer, a sheet having visible indicia thereon, a light-sensitive scanning device adapted to be affected by said indicia, and means comprising an electrical selector controlled by said scanning device for operatively combining one or another of said sound records with said sound reproducing apparatus in accordance with the visible indicia on said sheet, whereby a sound corresponding to the visible indicia being scanned is produced by said sound reproducer.

9. An apparatus in accordance with claim 8 in which said records each comprise a light beam modifying track and in which said sound reproducing apparatus comprises a light-sensitive cell adapted to be affected by a beam of light acting on one or more of said tracks to produce audible sound.

10. An apparatus for producing intelligible audible sounds in accordance with visible indicia appearing on a sheet, comprising a sound record having a plurality of light beam modifying sound tracks thereon, each adapted to produce in a sound reproducer, a different, predetermined sound, a sound reproducer comprising a light-sensitive cell, means for projecting a light beam and means for directing the beam to a particular track and thence to said cell to produce a predetermined audible sound, said directing means being actuated and controlled by the visible indicia appearing on said sheet.

11. An apparatus for producing intelligible audible sounds in accordance with visible indicia appearing on a sheet, comprising a sound record having a plurality of light beams modifying sound tracks thereon, each adapted to produce in a sound reproducer, a different predetermined sound, a sound reproducer disposed in operative relation to said record, a mirror for projecting a light beam to one or another of said sound tracks to produce in said reproducer, a predetermined sound, and means for varying the position of said mirror to render one or another of said sound tracks operative, said means being actuated and controlled by the visible indicia on said sheet.

12. An apparatus for producing intelligible audible sounds in accordance with visible indicia appearing on a sheet, comprising a light sensitive scanning device, a sound record having a plurality of light beam modifying sound tracks thereon, each adapted to produce in a sound reproducer, a different predetermined sound, a sound reproducer disposed in operative relation to said record, a mirror for projecting a light beam to one or another of said sound tracks to produce in said reproducer, a predetermined sound, and means for varying the position of said mirror to render one or another of said sound tracks operative, said means being actuated and controlled by said scanning device.

13. An apparatus for producing intelligible audible sounds in accordance with visible indicia appearing on a sheet, said apparatus comprising a photronic cell scanning device arranged to be effected by such indicia, a galvanometer mirror in the cell circuit adapted to be oscillated in accordance with current variations therein, a sound record associated with the mirror and having a plurality of different individual light beam modifying sound tracks, a source of light adapted to project a beam onto the mirror, and a photo-electric sound reproducing apparatus, said mirror being adapted to reflect the light beam to one or another of said sound tracks and to the sound reproducer in accordance with the position to which it is oscillated by the scanning device, to produce a sound corresponding to the indicia being scanned.

14. An apparatus for producing intelligible audible sounds in accordance with visible indicia appearing on a sheet, comprising a sound record having a plurality of light beam modifying sound tracks thereon, each adapted to produce in a sound reproducer, a different predetermined sound and each track commencing and ending at predetermined points on the record, a sound reproducer comprising a light sensitive cell, means for projecting a light beam to said record and thence to said cell to produce audible sounds, means for directing the beam to a particular track to produce a predetermined sound corresponding to the visible indicia on said sheet, and means to prevent the operation of said sound reproducer except when the beam cooperates initially with the beginning of any one of said sound tracks.

15. An apparatus for producing intelligible audible sounds in accordance with visible indicia appearing on a sheet, comprising a light sensitive scanning device, a sound record having a plurality of light beam modifying sound tracks thereon, each adapted to produce in a sound reproducer, a different predetermined sound and each track having a definite point of commencement and a definite point of termination on the record, means for rotating the record to move the tracks past a light beam and the photo-electric cell of a sound reproducer, means for projecting the light beam to one or another of the sound tracks to produce a sound corresponding to the indicia being scanned by the scanning device, and means controlled by the scanning device and the rotation of the record to prevent operation of the sound reproducer except when the beam of light is projected to a sound track at the point of commencement thereof.

16. An apparatus for producing intelligible audible sounds in accordance with visible indicia appearing on a sheet, comprising a light sensitive scanning device, a sound record having a plurality of light beam modifying sound tracks thereon, each adapted to produce in a sound reproducer, a different predetermined sound and each track having a definite point of commencement and a definite point of termination on the record, means for rotating the record to move the tracks past a light beam and the photo-electric cell of a sound reproducer, means for projecting the light beam to one or another of the sound tracks to produce a sound corresponding to the indicia being scanned by the scanning device, and shutter means controlled by the scanning device and the rotation of the record to interrupt the beam of light except when the same is projected onto one of said tracks at the point of commencement thereof.

17. The method of producing intelligible audible sounds corresponding to optical indicia to mechanically read a printed sheet, which method comprises providing a plurality of records, each having a sound recorded thereon corresponding to an indicia, electrically selecting a record corresponding to a particular indicia, and reproducing the sound from the selected record.

18. The method of mechanically reading visible indicia appearing on a sheet, comprising providing a sound record having a plurality of different independent sounds recorded on different portions thereof, each adapted to produce a predetermined sound in a sound reproducer, and electrically selecting the various sounds in accordance with the optical character of the indicia on said sheet.

19. The method of producing intelligible audible sounds in accordance with optical indicia on a sheet comprising providing a sound record having a plurality of sounds corresponding to the said indicia recorded thereon, scanning the indicia with a light-sensitive, electrical scanning device, automatically selecting the sound on said record corresponding to the indicia being scanned, and reproducing the sound so selected.

20. The method of producing intelligible audible sounds in accordance with optical indicia on a sheet comprising providing a sound record having a plurality of sounds corresponding to the said indicia recorded thereon, scanning the indicia with a light-sensitive, electrical scanning device, automatically electrically selecting the sound on said record corresponding to the indicia being scanned, and reproducing the sound so selected.

WALLACE W. FULLER.